July 14, 1942.   J. I. GORTON   2,289,908
FLUID TEMPERATURE TESTING DEVICE
Filed Feb. 9, 1940
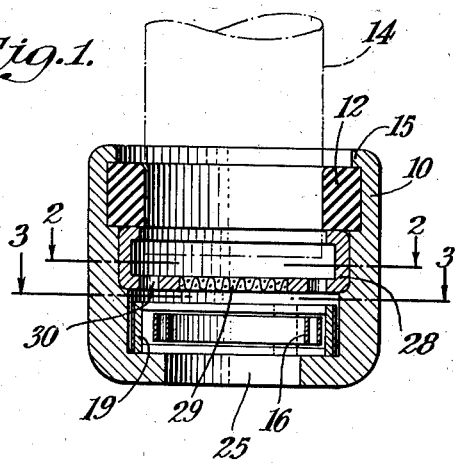
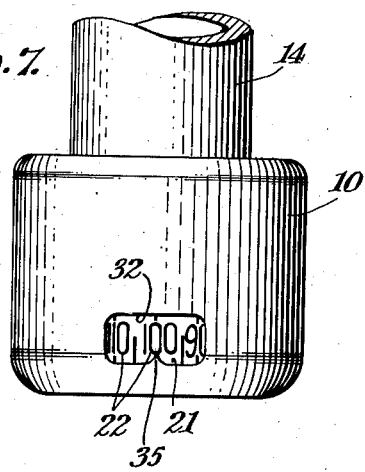
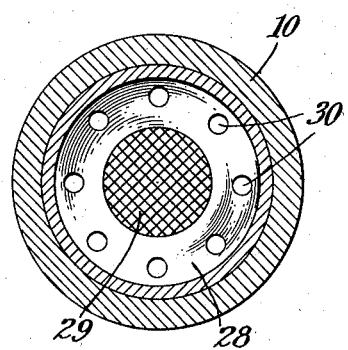
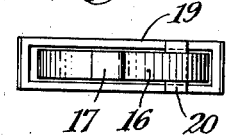
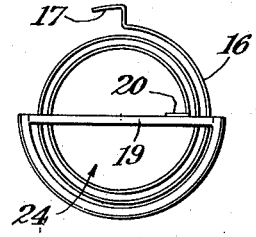
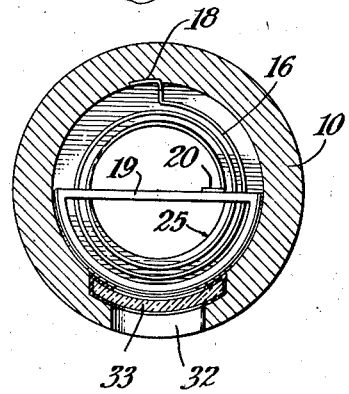
INVENTOR
James I. Gorton
BY
ATTORNEY Patented July 14, 1942

2,289,908

UNITED STATES PATENT OFFICE 2,289,908

FLUID TEMPERATURE TESTING DEVICE

James I. Gorton, White Plains, N. Y.

Application February 9, 1940, Serial No. 318,117

5 Claims. (Cl. 73—349)

This invention relates to improvements in measuring and testing devices and more particularly relates to a testing device for testing the temperature of a flowing liquid stream.

One of the principal objects of my invention is to provide an improved type of temperature responsive testing device which can be temporarily applied to the discharge faucet or nozzle of a fluid conduit so that the temperature of the fluid can be quickly, accurately, and constantly determined.

Another and more particular object of my invention is to provide a detachable testing device which can be applied to the usual household water tap and which has a temperature responsive element which gives a substantially instantaneous indication of the temperature of the water flowing therethrough so that a continuous visual inspection can be made of the temperature of the water flowing and without hindrance thereto.

Another object of the invention is to provide a testing device for temporary attachment to the usual household water tap, which has an internal thermally responsive coil so located as to be without hindrance to the water flow but so arranged as to give a continuous visual reading of the temperature of the flowing stream.

A more specific object of the invention is to provide an inexpensive, attractive, and simple thermometer for determining the temperature of flowing liquid streams which can be readily attached to a nozzle or similar conduit where a temperature condition is to be determined for a temporary period.

Further objects and advantages of my invention will appear from the following description of a preferred form of embodiment thereof, taken in connection with the drawing attached hereto, and in which:

Fig. 1 is a vertical section at approximately double scale of the testing device;

Figs. 2 and 3 are horizontal sections taken along the lines 2—2 and 3—3 respectively of Fig. 1;

Fig. 4 is an elevation of the thermally responsive element;

Fig. 5 is a top plan view of the element shown in Fig. 4;

Fig. 6 is an enlarged elevation of the indicator element; and

Fig. 7 is an elevation of the completed testing device, shown attached to a fluid nozzle.

In accordance with a preferred form of embodiment of my invention, I have shown a measuring and testing device which is more particularly adapted to indicate the temperature of a liquid flowing therethrough. Such device is particularly characterized in being simple to manufacture, readily attachable to and detachable from a nozzle water tap or other liquid conduit, etc., and is arranged to not materially disturb the flow of liquid.

The testing device is primarily comprised of a body portion, specifically indicated at 10, which is conveniently a hollow cylinder, one end of which has a rubber or other form of gasket such as 12, by which the device may be secured in a leakproof manner to a tap, nozzle or conduit, as shown in the drawing at 14. Preferably the testing device has a turned-over flange 15 which serves to hold the gasket 12 in place. The gasket is made relatively thick so that it will facilitate attachment to various size conduits, and of the round or oval type as is commonly experienced in the common hot water taps.

The operative part of the testing device is the thermally responsive element 16 which is preferably a suitable form of spiral metallic element as shown in Fig. 5. It is conveniently arranged at one end 17 to be attached as at 18 to the body portion of the testing device, and the other end is conveniently attached to an indicator framework 19 as at 20. This framework, on its outer elevation, carries an indicator card 21 having suitable markings 22 for the temperature range of the device.

The thermally responsive element 16 is preferably provided with a relatively large central opening 24 which is substantially the diameter of the discharge opening 25 in the body portion of the testing device. This permits liquid to flow through the device without seriously disaligning the thermally responsive element which might otherwise occur when the flow commenced. Furthermore, the flow of liquid is not interrupted in any appreciable manner.

I have found that the most satisfactory manner of transferring the heat of the fluid stream to the thermally responsive element is to provide a diffuser between the thermally responsive element and the nozzle entrance. A type of diffuser which has proved entirely successful is indicated at 28 and is provided with a central bore 29 which, if desired, may be covered by a foraminous material. Surrounding this bore 29 I provide a series of relatively small apertures 30, such apertures being vertically over the coils of the thermally responsive element 16. The slight resistance to flow of the fluid resulting from the use of the diffuser 28 does not materially disturb the liquid flow but it does assure a proportional amount of flow over the coils in a relatively fine stream and without possibly disturbing the coils.

The body portion of the testing device is conveniently provided with an aperture as at 32, such aperture being covered with a transparent material 33 through which the indicator card 21 can be seen. A central index 35 is used as a reference mark.

It will be noted that, for economy in manufacture, the interior of the body portion is made of suitable different diameters to first receive the thermally responsive coil 16, and then the diffuser 28, which may have a flanged edge which serves as a limit support for the gasket 12. As before mentioned, the gasket may be inserted under flange 15 and this thereby holds all of the parts in place.

The temperature responsive testing device is especially useful in comparative tests for the determination of the uniformity of temperature of water flowing from a water tap as it may be applied without interference with the water flow and will give a continual temperature reading. The effect of the rapid use of large volumes of hot water on temperature where a particular source of hot water is being inspected can thus be indicated. It can be used, of course, under many other conditions to determine heat or coldness of any liquid stream, and, although this form of embodiment is primarily constructed for attachment to a water tap, it can, of course, be used under other conditions. Its compactness and determination of the temperature of a part of the total stream make it possible to effect almost instantaneous readings, and the device is unusually rugged, easy and inexpensive to manufacture, and unlikely to get out of order.

While I have shown and described a preferred form of embodiment of my invention, I am aware that modifications may be made thereto, and I, therefore, desire a broad interpretation of my invention within the scope and spirit of the description herein and of the claims appended hereinafter.

I claim:

1. A gage for checking the temperature of a flowing stream which comprises a tubular body member, means at one end thereof to form a leak-proof joint with a conduit, the opposite end of the body member having an opening forming an outlet nozzle portion of substantially the same cross sectional area as the conduit, a thermally responsive device within said body member and out of the direct path of the fluid stream therethrough, an indicator movable by said thermally responsive device, said body member having means to gage the movement of said indicator, and means within the body member to direct a portion of the liquid passing therethrough into direct contact with said thermally responsive means.

2. A measuring and testing device for detachable connection to a water tap which includes a tubular body portion, a gasket adjacent the opening in one end for engaging the tap, a diffuser for diffusing a part of the water flow to the other end of the body portion, a thermally responsive device adjacent the wall of the body portion and in line with the flow of the part of the water to the outlet, said thermally responsive device being out of the path of flow of the main part of the water to the outlet, said body portion being of different diameters to first receive the thermally responsive device, the diffuser and the gasket, an indicator actuated by said thermally responsive device, said body portion having a window through which said indicator may be viewed and having a flange to lock the gasket and thereby the remaining parts in place.

3. A gage for checking the temperature of a flowing stream which comprises a tubular body member, means at one end thereof to form a leak-proof joint with a conduit, the opposite end of the body member having an opening forming an outlet nozzle portion of substantially the same cross sectional area as the conduit, a spirally wound, bimetallic, thermally responsive device within said body member and having one end attached to the body portion, an indicator within said body portion attached to the other end of the thermally responsive device, means to shield the thermally responsive device from the impact of the main flow of the stream through the body member, said shielding means having apertures to direct a portion of the stream into direct contact with the thermally responsive device, said body member having a window whereby the movement of said indicator may be gaged.

4. A measuring and testing device of the class described comprising a tubular body portion having means in one end thereof to make a leak-proof connection with a conduit, a bimetallic thermally responsive device within said body portion, an indicator secured to one end of said thermally responsive device, the other end of said thermally responsive device being secured in immovable relation to the body portion, said body portion having an aperture therein whereby movement of said indicator can be visually inspected and gaged, said device having a substantially continuous central bore substantially equal to the outlet thereof.

5. A measuring and testing device as claimed in claim 4 adapted to be temporarily attached to the nozzle of a water faucet, said leak-proof connection means including a flexible gasket carried in the end thereof and adapted to detachably engage a water faucet nozzle.

JAMES I. GORTON.